United States Patent [19]

Hayman

[11] Patent Number: 4,530,238

[45] Date of Patent: Jul. 23, 1985

[54] HIGH PRESSURE SEAL ASSEMBLY

[75] Inventor: Lawrence A. Hayman, Houston, Tex.

[73] Assignee: NL Industries, Inc., New York, N.Y.

[21] Appl. No.: 509,485

[22] Filed: Jun. 30, 1983

[51] Int. Cl.³ ............................................. G01D 11/26
[52] U.S. Cl. ........................................ 73/431; 220/240
[58] Field of Search .................. 73/431; 220/221, 222, 220/224, 240

[56] References Cited

U.S. PATENT DOCUMENTS

| 3,042,248 | 7/1962 | Krueger | 220/240 |
| 3,687,333 | 8/1972 | Burnett et al. | 220/240 |
| 3,843,016 | 10/1974 | Bornhorst et al. | 220/240 |
| 4,098,490 | 7/1978 | Morrison | 220/240 |

Primary Examiner—S. Clement Swisher
Attorney, Agent, or Firm—Carl O. McClenny; Wiliam E. Johnson, Jr.

[57] ABSTRACT

A high pressure seal assembly for use with an insert cover positioned in a downhole tubular housing, the assembly having a flange which is deformable by the pressure differential between higher pressure on the exterior of the insert cover and the lower pressure on the interior of the insert cover. A portion of the flange is deformed to mate against the tubular housing. In a preferred embodiment, the flange has two legs, one being attached to the insert cover and the second being the deformable portion having deformable spacer material positioned between the second leg of the flange and the housing.

1 Claim, 2 Drawing Figures

HIGH PRESSURE SEAL ASSEMBLY

BACKGROUND OF THE INVENTION

This invention relates to seal arrangements and in particular seals useful in subterranean recovery of oil and gas. More particularly, it relates to a mechanical seal for inserts in drill pipe sections used in such recovery.

One particular illustration of sealing arrangements includes measurement while drilling applications. In such applications, highly sophisticated and sensitive electronic and mechanical apparatus are placed downhole to sense the parameters of the surrounding formation and the drill string, to analyze and convert the collected information and to record and transmit the information to the surface of the earth. The electronic apparatus is typically contained in an insert cover which is positioned in the interior of the drill string which is lowered into the borehole through the earth formations.

The interior of the drill string and in particular the interior conduit of the pipe sections for holding the insert is machined to close tolerances for mating with the insert cover. A variety of seal arrangements have been devised to seal inserts in the drill pipe. Typically, a seal arrangement requires a close tolerance between mating parts with a deformable seal positioned between the machined parts. One form of the deformable seal is an O-ring. Typically, for an O-ring having deformation characteristics of 90 durometers to maintain a pressure seal of 3000 psi, a tolerance between the insert cover and the interior of the drill pipe sections must be less than 0.006 in. This degree of tolerance is difficult to achieve with long internal boring machines.

Furthermore, with use the insert must be removed and replaced numerous times. This use will result in deterioration of the tolerance by scratching, bending, expansion, etc. Further as the measurement while drilling apparatus is used in deeper formations, the pressure differential between the exterior and interior of the insert increases to a point where additional sealing arrangements are necessary beyond the mating of the insert cover and O-ring with the interior of the drill string.

In oil recovery enhancement techniques, and in wells used in geothermal production, these pressure seals frequently must function under conditions of elevated temperature, high pressures and corrosive surface environment. The O-ring type seals used under high pressure differential will fail unless the tolerance between the mating parts is increased. Because of the harsh environment and other technical requirements associated with such applications, a very durable seal arrangement that can be utilized with commercial drill stems is necessary.

In accordance with the invention, there is provided a seal arrangement that includes a tubular body member having a longitudinal passage therethrough. Along the passage there is an annular recess in which an insert cover in its entirety is disposed. Along the peripheral edge of the insert, a deformable edge is formed to mate with the interior of the annular recess. The interior of insert cover, that is the space between the insert cover and the body member is of a relatively lower pressure than that of the exterior of the insert in the longitudinal passage. Between the deformable edge and the interior of the annular recess is situated deformable spacer material.

The seal is positioned toward the portion of the edge away from the insert. Application of hydraulic pressure on the inner surface of the peripheral edge causes a radially outward bending expansion and elastic and/or plastic deformation of the edge and forces the outer surface of the edge into a sealing engagement with the deformable spacer material and in turn that into a sealing engagement with the opposed surface of the interior of the annular recess in which the insert cover is disposed.

Further features and advantages of the invention will be seen as the following description of the particular embodiment progresses, in conjunction with the drawing which:

Figure 1:
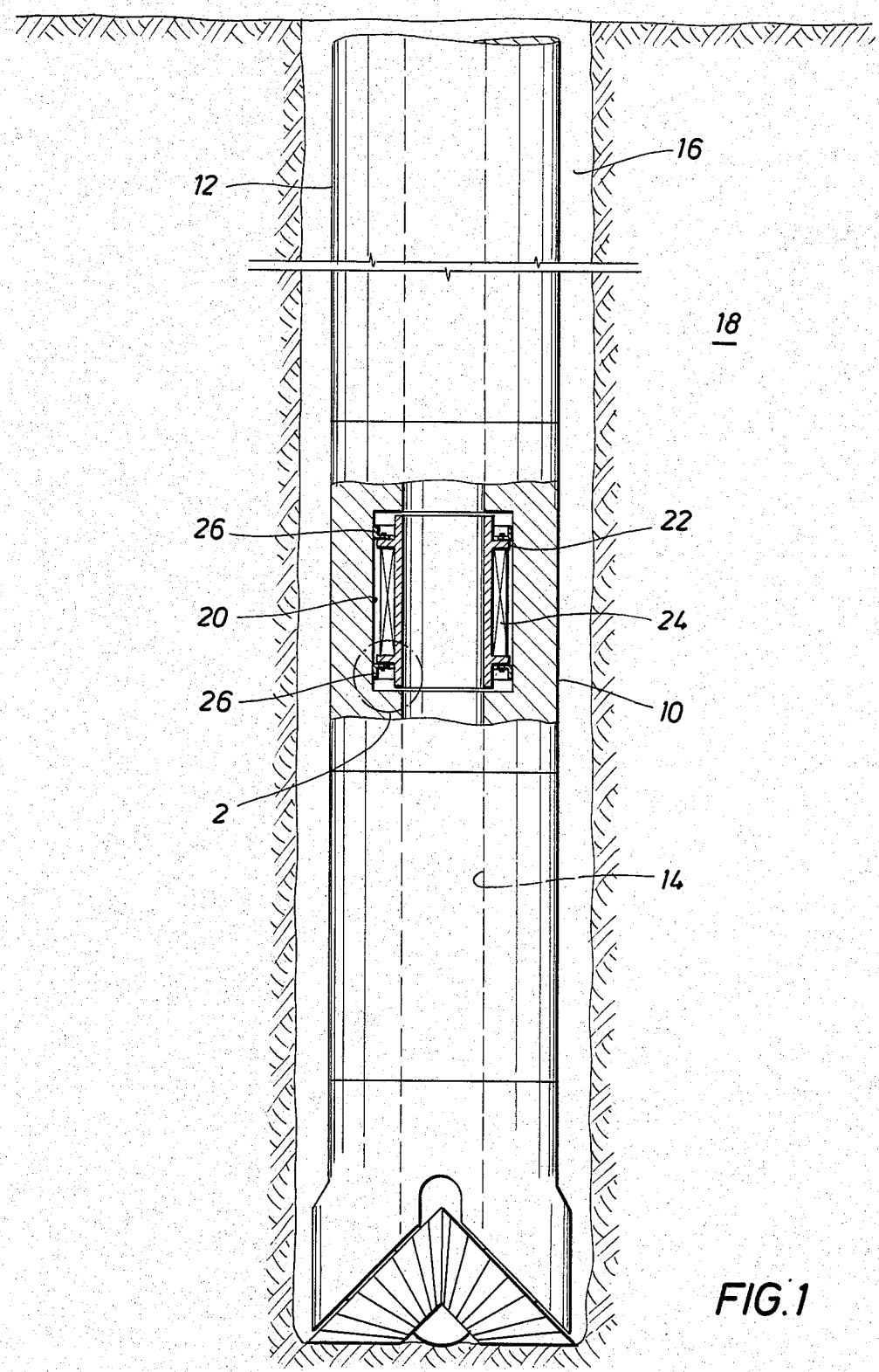
FIG. 1 is a diagram of a typical application of the seal arrangement in a drill string partly in section.

Referring to the particular embodiment shown in the FIG. 1, there is shown a pipe section 10 for incorporation in a drill string 12 and having a longitudinal passage 14 therethrough positioned in a borehole 16 traversing an earth formation 18 downward from the surface of the ground. Drilling fluid is pumped down the passage 14 from the surface, out the bottom end of the drill string 12 and up the annulus between the drill string 12 and borehole 16.

An annular recess 20 is formed near the upper end of pipe section 10. An annular insert cover 22 is disposed in recess 20. The insert cover will house sensing, analytical recording and transmitting equipment 24 disposed in the recess 20 for measuring formation parameters. The insert cover however only holds the apparatus in place and marginally seals the fluids contained on the interior of the drill string from the apparatus.

Figure 2:
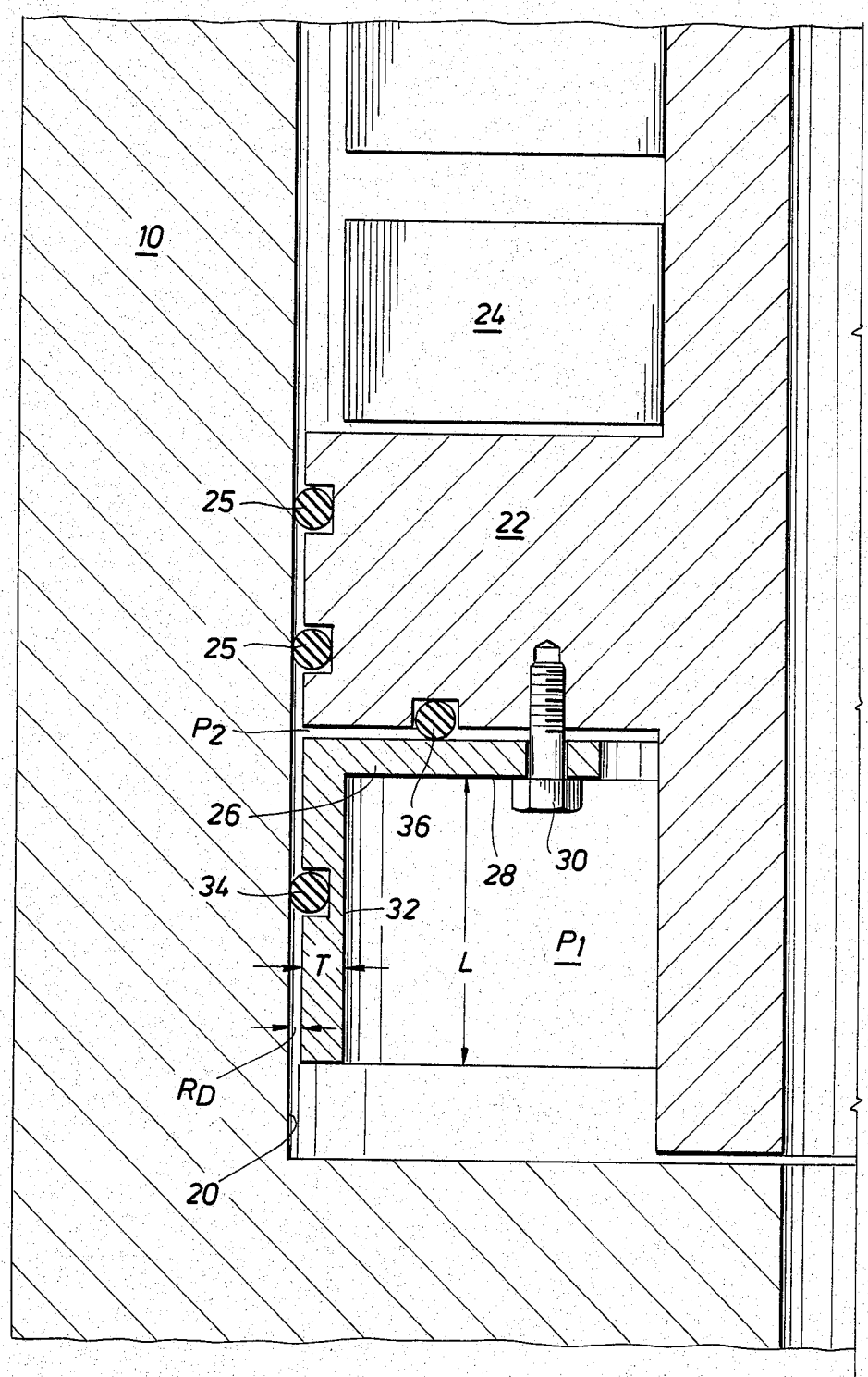
FIG. 2 is an enlarged diagram of a portion of the sectional view of the insert and tubular body member.

The seal arrangement in accordance with the invention may be used at both ends of the insert 22. Further details of the seal arrangement may be seen with reference to FIG. 2. The insert cover 22 may be disposed on deformable materials such as polymeric O-rings 25. These O-rings 25 provide mechanical support, backup sealing and vibrational dampening for the insert equipment 24. The backup sealing is limited, however, since the tolerance between the cover and the interior wall surface is not sufficiently maintained.

The seal arrangement of this invention is formed along the annular peripheral edge of the insert cover 22 and consists of a deformable annular flange 26 that is selected to have an outer diameter slightly less than the interior diameter of the recess 20. Preferably the flange 26 is formed with the legs 28 and 32.

The first leg 28 of the flange 26 is attached to the insert cover 22 by fastener means 30. The point of attachment for the first leg 28 to the fastener means 30 preferably allows tolerance for the flange to expand radially outward. The second leg 32 of the flange 26 is positioned opposing the interior wall of the recess 20. Between the second leg 32 and the interior wall of pipe section 10 is positioned an O-ring seal 34. A second O-ring seal 36 is positioned between the first leg 28 and the insert cover 22. O-ring seal 36 is preferably positioned radially outward of the fastener means 30.

A pressure P1 in passage 14 is created by the drilling fluid pump (not shown) at the surface and the hydrostatic head of the column of drilling fluid contained in the drill string 10. A pressure P2 is the pressure in the cavity formed by insert cover 22. The pressure is normally atmospheric since equipment 24 is sealed in the insert cover 22 at the surface.

The length of first leg 32 and the position of the fastener 30 should be such that the first leg is deformable to mate with O-ring 36.

The selection of materials for the O-rings 34 and 36 is dependent upon $R_D$, the expected tolerance difference, between the interior of the recess 20 and the outside radius of the second leg 32 of flange 26.

The thickness of the flange, T, the length of the flange, L, the materials of construction of the flange 26, may be determined from the mechanics of materials' deflection relationships based on the modulus of elasticity of the selected materials, the moment of inertia of the flange design and the pressure differential between P1 and P2. Selection of materials may also permit the expansion of the diameter of the flange by the pressure differential between P1 and P2.

The first O-ring seal 34 should be positioned near enough to the end of the second leg 32 so as to allow the leg to be deformed by the pressure differential between $P_1$ and $P_2$. The second O-ring seal 36 should be positioned to allow the first leg 28 to be deformed by the pressure differential between $P_1$ and $P_2$.

The legs 28 and 32 and insert cover 22 may be formed to include retainer means for the respective O-rings. These retain means may be either recesses in the legs 28 and 32 or tabs on legs 28 and 32.

Typical spacer materials for the type of seal of this embodiment are elastomers and special components such as graphite seal arrangements, asbestos, and wire.

While particular embodiments of the invention have been shown and described, various modifications will be apparent to those skilled in the art, and therefore it is not intended that the invention be limited to the disclosed embodiments or to details thereof and departures may be made therefrom within the spirit and scope of the invention. This is particularly true since the sealing arrangement of this invention may be applied to any surface and cover arrangement where there exists a differential pressure between one surface of the cover and the interior of the cover.

What is claimed is:

1. A seal assembly comprising: a cylindrically-shaped housing having a longitudinal passage therethrough; an insert cover mounted in said passage, said insert cover forming an interior space between said insert cover and said housing and being exposed on its exterior to a relatively high fluid pressure and on its interior to a fluid pressure less than said relatively high fluid pressure; and flange means positioned about the periphery of said insert cover, a portion of said flange means being deformable by the pressure differential between said high pressure and said low pressure to sealably mate with said housing.

* * * * *